L. K. MULFORD.
CURTAIN ATTACHMENT FOR WINDSHIELDS.
APPLICATION FILED FEB. 24, 1919.
1,400,567.
Patented Dec. 20, 1921.
2 SHEETS—SHEET 2.
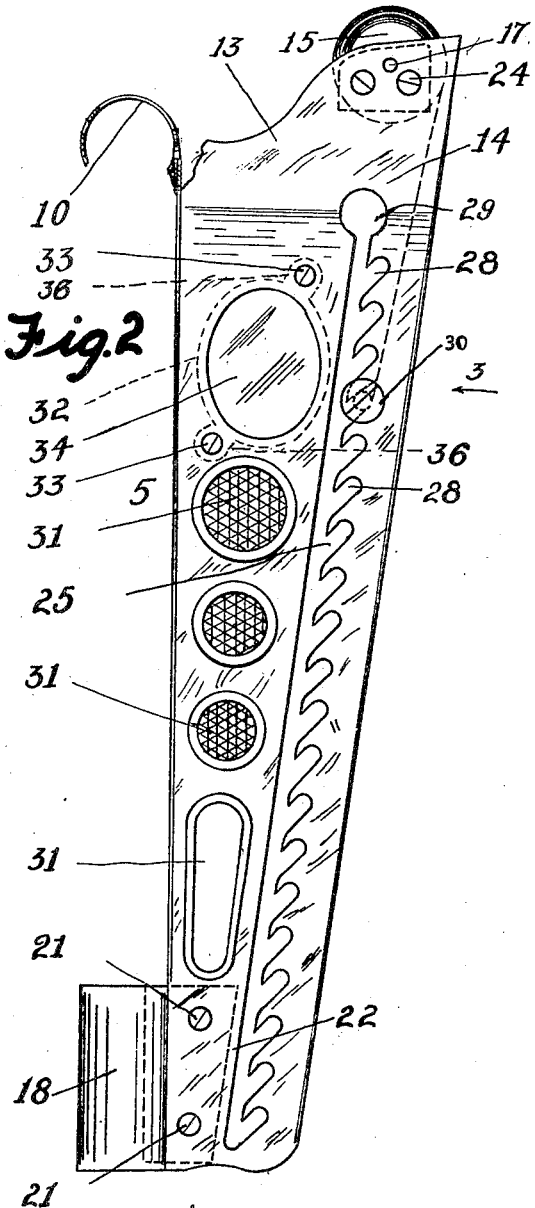
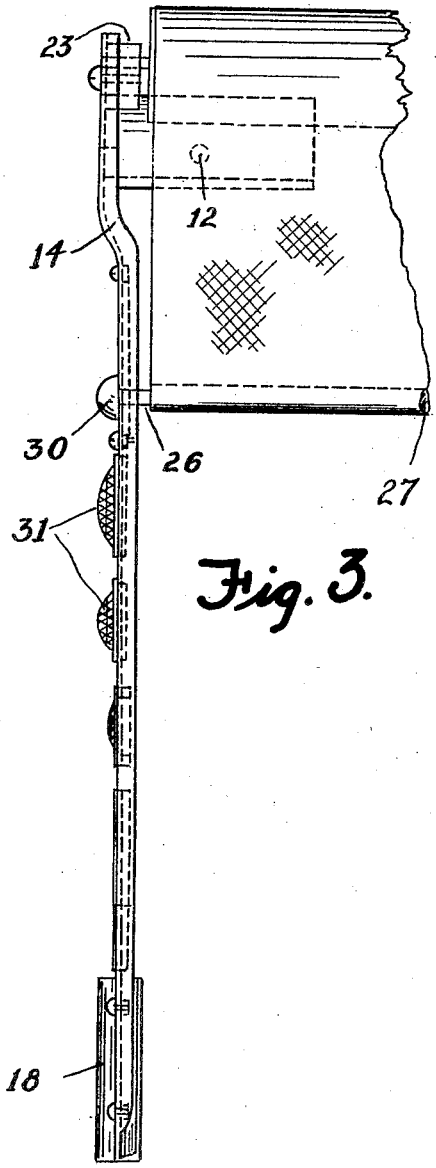
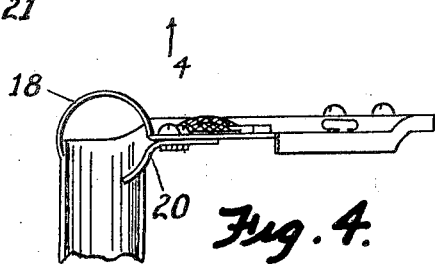
Inventor
Louis K. Mulford.

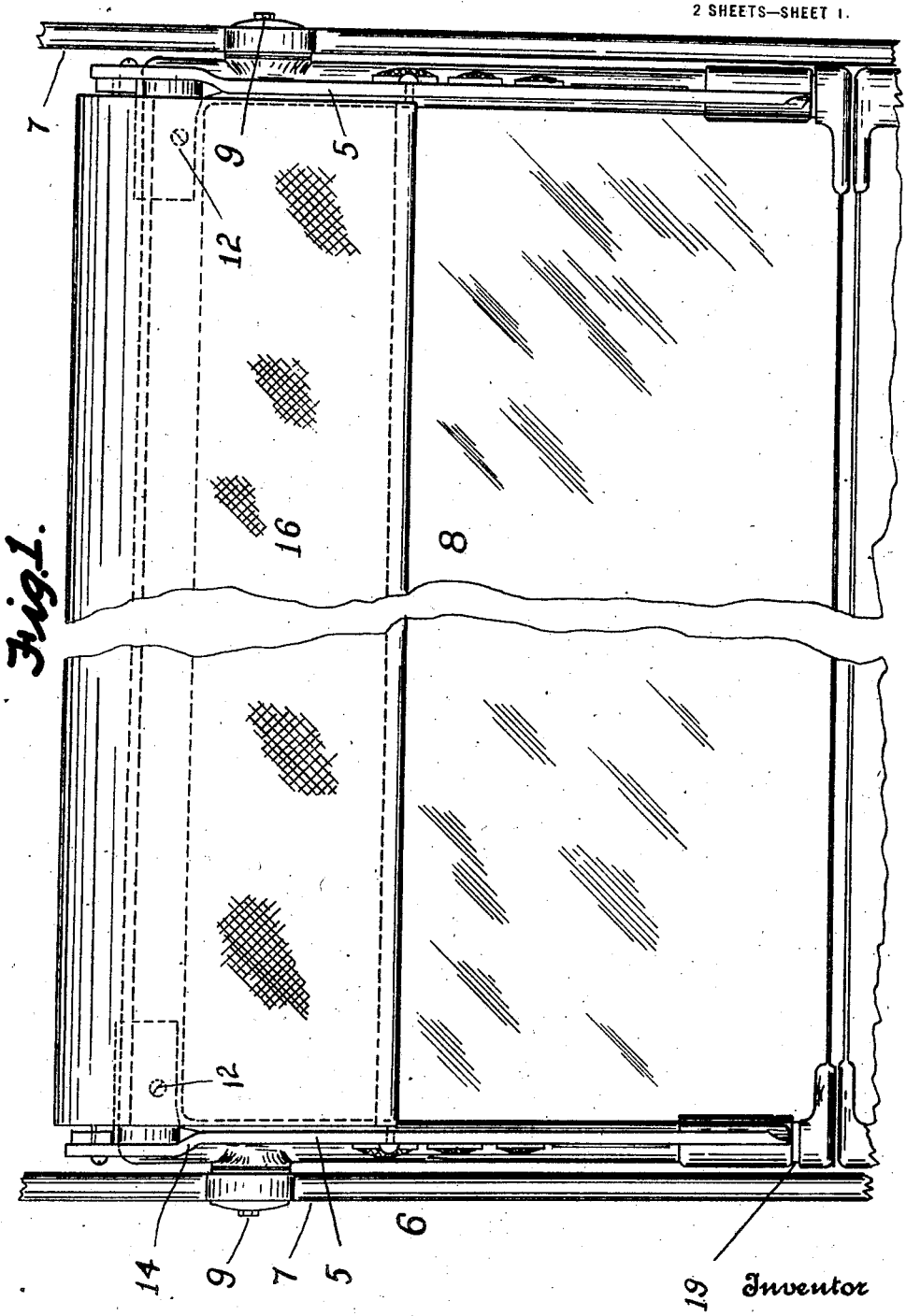

UNITED STATES PATENT OFFICE.

LOUIS K. MULFORD, OF DENVER, COLORADO.

CURTAIN ATTACHMENT FOR WINDSHIELDS.

1,400,567.  Specification of Letters Patent.  Patented Dec. 20, 1921.

Application filed February 24, 1919. Serial No. 278,667.

*To all whom it may concern:*

Be it known that I, LOUIS K. MULFORD, a citizen of the United States, residing at the city and county of Denver and State of Colorado, have invented certain new and useful Improvements in Curtain Attachments for Windshields; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements for protecting the eyes of the occupants of an automobile from the sun passing through the windshield, which is often very annoying, particularly to the driver, since the rays are sometimes so intensified as to be almost blinding.

My improvement consists in equipping the upper movable member of the windshield with a shade of the spring-roller type, the roller being mounted in brackets secured to the windshield member and extending rearwardly therefrom sufficiently to allow the operation of a windshield cleaning device forward of the shade. The brackets employed are provided with clamping members, the upper of which are horizontally disposed and arranged to grasp the upper rail of the windshield member, while the lower clamping members clasp the vertically disposed rods respectively of the said member. If desired, the entire lower portion of the shade brackets may be omitted, leaving only the clamps, which are applied to the upper, horizontally disposed rail of the member, and rearwardly projecting arms for retaining the shade roller in proper coöperative relation with the structure.

Having briefly outlined my improvement, I will proceed to describe the same in detail, reference being made to the accompanying drawing, in which is illustrated an embodiment thereof. In this drawing—

Figure 1 is a rear fragmentary view of the windshield of an automobile equipped with my improved attachment.

Fig. 2 is a side detail elevation of one of the brackets employed, the shade roller and shade being also seen in end elevation.

Fig. 3 is a rear view of the same structure, or a view looking in the direction of arrow 3, Fig. 2.

Fig. 4 is a bottom end view of the bracket, or a view looking in the direction of arrow 4, Fig. 2.

The same reference characters indicate the same parts in all the views.

Let the numeral 5 designate each of two brackets, which are spaced to correspond approximately with the width of the windshield of an automobile, which is designated in its entirety by the numeral 6.

In Fig. 1 of the drawing, the side bars 7 of the windshield, which bars are stationary with the vehicle, and of the well known construction, are illustrated, the upper member 8 of the windshield being pivotally connected with the side bars, as shown at 9, or in the usual manner. The upper extremity of each bracket 5 is provided with an inwardly projecting clamping member, 10, which is adapted to grasp the top rail of the member 8. This clamp is preferably slightly greater in curvature than a half circle, but is yielding or composed of spring material so that it may be crowded downwardly upon the top cylindrical rail of the windshield member, after which it will securely grasp the member. It is preferred, however, to further secure the bracket at the top by applying screws, 12, to the clamp, both in the front and rear. These may be simply set screws, or they may be threaded into the top rail, as may be desired, or the clamps 10 may be riveted to the top rail to prevent removal by an unauthorized person. Extending rearwardly from the clamps 10 are the top portions, 13, of the brackets, which are outwardly offset, as shown at 14, for a purpose hereinafter described. The length or width of these upper portions 13, which afford supports for the shade roller 15, is such as to permit the operation of the shade 16 sufficiently in the rear of the windshield member 8, to permit the movement of a windshield cleaner of the usual or any suitable construction, forward of the path of the shade, whereby the latter may be manipulated without interference from the windshield cleaner, where such cleaner is employed.

One of the brackets 5 has a circular perforation 17 to receive the fixed or pivotal pin in one end of the shade roller, while the corresponding portion of the other bracket is fashioned to receive the flattened projection at the opposite end of the roller and hold it against rotation in the usual manner. As the shade roller employed is of the usual spring type, no attempt has been made to illustrate this feature in detail.

The lower extremity of each bracket 5 is provided with a clamping member 18, which is adapted to engage the lower portion of the side rail 19 of the windshield member 8. A coöperating clamping part 20 is employed and is connected with the lower part of the bracket on the inside by means of fastening devices, as screws, 21, which are passed through perforations formed in the lower part, 22, of the bracket, and threaded into the part 20. This attachment to the part 20 may, of course, be made in any suitable or convenient manner.

The recesses for receiving the opposite ends of the shade roller are formed not only in the offset parts, 13, of the brackets, but extend through small blocks, 23, which afford sufficient stock for shade roller bearings, these blocks being secured to the brackets by suitable fastening devices as screws, 24.

Each bracket 5 is provided with a slot, 25, adapted to receive the adjacent extremity, 26, of the rod 27, which is attached to the free extremity of the shade 16, whereby the shade may be drawn downwardly to the lower extremities of the brackets, if desired. Extending rearwardly from this slot, and communicating therewith, are inclined recesses, 28, which are adapted to receive the ends, 26, of the rod, and support the shade in any desired position of vertical adjustment, as well illustrated in Fig. 2 of the drawing. When it is desired to change the position of the shade, either for raising or lowering purposes, it is only necessary for the person in the machine to move the rod downwardly and forwardly, when its extremities will enter the continuous slot, 25, in which the extremities of the rod may travel freely, either upwardly or downwardly, until the desired area of the glass portion of the member 8 of the windshield is covered.

The upper extremity of the slot 25 of each bracket is enlarged, as shown at 29, to allow the head or enlargement, 30, at the outer extremity of the rod, to pass through, which is permitted by the offset 14, in order that the rod of the shade may be disengaged from the brackets, in which event the shade may be pulled downwardly, not only to cover the glass of the upper member 8 of the windshield, but also that of the lower portion, or to any extent desired. Under these circumstances, it will be understood that the shade is adjusted independently of the brackets 5, except that the latter afford the necessary support for the shade roller, and keep shade from flapping.

The brackets 5 may be ornamented to any extent desired, certain ornaments being illustrated in the drawing and designated by the numeral 31. The upper portion of each bracket may be provided with a removable plate 32, which is held in place by screws, 33, passed through ears, 36, formed in the plate. This plate is flanged to form a receptacle, and extends inwardly from an opening through the bracket, and the opening may be exteriorly closed by a mirror, 34, or any other suitable device.

Having thus described my invention, what I claim is:

1. The combination with a window member, of shade roller brackets, mounted at the top of the upper member thereof and extending rearwardly therefrom, a shade mounted in the brackets and having a rod in the lower end thereof, the brackets also having downwardly inclined recesses to receive the extremities of the rod to hold the shade in adjusted position.

2. The combination with an automobile windshield, of shade roller brackets mounted at the top of the upper member thereof and extending rearwardly therefrom, a shade mounted in the brackets and having a rod in the lower end thereof, the brackets also having downwardly extending parts slotted to receive the extremities of the rod of the shade, said brackets being provided with recesses communicating with the slots for engaging the rod and retaining the shade in the desired position of adjustment.

3. The combination with the windshield, of a motor vehicle, of shade roller brackets mounted at the top of the upper member thereof and extending rearwardly therefrom, a shade mounted in the brackets and having a rod in the lower end thereof, the brackets being toothed to form recesses inclined to engage the rod and secure the shade in the desired position of adjustment.

4. The combination with a windshield, of shade roller brackets mounted thereon, a shade and roller mounted in said brackets and a rod on the shade, said brackets being slotted to receive the extremities of the rod at the free extremity of the shade, the upper extremities of the slots being enlarged and the brackets offset outwardly to allow the rod extremities to escape from the slots for the purpose set forth.

In testimony whereof I affix my signature.

LOUIS K. MULFORD.